United States Patent
Salvatella Radressa et al.

(10) Patent No.: US 11,225,573 B2
(45) Date of Patent: Jan. 18, 2022

(54) THERMOPLASTIC POLYURETHANE COMPOSITION

(71) Applicant: Lubrizol Advanced Materials, Inc., Cleveland, OH (US)

(72) Inventors: Daniel Salvatella Radressa, Terrassa (ES); Trinidad Piedra Clemente, Barcelona (ES)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 16/975,224

(22) PCT Filed: Feb. 8, 2019

(86) PCT No.: PCT/US2019/017234
§ 371 (c)(1),
(2) Date: Aug. 24, 2020

(87) PCT Pub. No.: WO2019/164684
PCT Pub. Date: Aug. 29, 2019

(65) Prior Publication Data
US 2020/0392333 A1    Dec. 17, 2020

(51) Int. Cl.
| | | |
|---|---|---|
| *C08G 18/66* | (2006.01) |
| *C08L 75/06* | (2006.01) |
| *C08G 18/10* | (2006.01) |
| *C08G 18/32* | (2006.01) |
| *C08G 18/40* | (2006.01) |
| *C08G 18/42* | (2006.01) |
| *C08G 18/61* | (2006.01) |
| *C08G 18/73* | (2006.01) |
| *C08G 18/76* | (2006.01) |

(52) U.S. Cl.
CPC .............. *C08L 75/06* (2013.01); *C08G 18/10* (2013.01); *C08G 18/3246* (2013.01); *C08G 18/4009* (2013.01); *C08G 18/4277* (2013.01); *C08G 18/61* (2013.01); *C08G 18/664* (2013.01); *C08G 18/73* (2013.01); *C08G 18/7657* (2013.01)

(58) Field of Classification Search
CPC ............ C08G 18/3215; C08G 18/6511; C08G 18/4277; C08G 18/664; C08L 75/06
See application file for complete search history.

(56) References Cited

U.S. PATENT DOCUMENTS

| | | |
|---|---|---|
| 5,599,874 A | 2/1997 | Singer et al. |
| 2014/0342110 A1 | 11/2014 | Zhu et al. |
| 2016/0264713 A1* | 9/2016 | Nakamura ......... C08G 18/4277 |
| 2018/0258283 A1* | 9/2018 | Bernabe ............... C08G 18/664 |

FOREIGN PATENT DOCUMENTS

| | | | |
|---|---|---|---|
| JP | 59135218 A | * | 8/1984 |
| JP | S61 168615 A | | 7/1986 |
| JP | 2014048453 A | * | 3/2014 |
| JP | 2014048454 A | * | 3/2014 |

* cited by examiner

*Primary Examiner* — Michael M Dollinger
(74) *Attorney, Agent, or Firm* — Eryn Ace Fuhrer; Teresan W. Gilbert

(57) ABSTRACT

The present invention provides a thermoplastic polyurethane comprising the reaction product of a polyisocyanate, a chain extender comprising hydroquinone bis (2-hydroxyethyl) ether, and a spiroglycol initiated polycaprolactone polyester polyol which exhibits reduced compression set %.

20 Claims, No Drawings

THERMOPLASTIC POLYURETHANE COMPOSITION

CROSS REFERENCE TO RELATED APPLICATION

This application claims priority from PCT Application Serial No. PCT/US2019/017234 filed on Feb. 8, 2019, which claims the benefit of European Application No. EP18382113.1 filed on Feb. 26, 2018, the entirety of all both of which is hereby incorporated by reference.

FIELD OF THE INVENTION

The disclosed invention relates to a novel thermoplastic polyurethane composition having unexpectedly low compression set.

BACKGROUND

The "compression set" of a thermoplastic polyurethane is a measure of the material's ability to resist permanent deformation after being compressed. It is usually expressed as a percentage of the original compression after the material has been allowed to recover from the force applied. Lower compression set is important for thermoplastic polyurethane materials used in applications subject to prolonged compression so that the material will not permanently flatten after being repeatedly or continuously subjected to compressing force. A reduced compression set thermoplastic polyurethane material is useful in any applications where the material will be subject to compression, for example, flooring, footwear, printing blankets, gaskets, seals, sponges, foams, wires and cables, conveyer belts, as well as other applications.

The present invention provides a thermoplastic polyurethane composition that has an unexpectedly reduced compression set.

SUMMARY OF THE INVENTION

The present invention is a thermoplastic polyurethane composition comprising the reaction product of (a) a polyisocyanate, (b) a chain extender comprising hydroquinone bis (2-hydroxyethyl) ether, and (c) a polyol component comprising a spiroglycol-initiated polycaprolactone polyol. The compositions of the present invention exhibit unexpectedly lower compression set % when compared to compositions made from different components.

DETAILED DESCRIPTION OF THE INVENTION

Thermoplastic polyurethane compositions of the present invention comprise the reaction product of (a) a polyisocyanate, (b) a chain extender comprising hydroquinone bis (2-hydroxyethyl) ether, and (c) a polyol component comprising a spiroglycol-initiated polycaprolactone polyol. The polyol component may further comprise a polysiloxane polyol. In one embodiment, the thermoplastic polyurethane composition comprises the reaction product of (a) a polyisocyanate, (b) a chain extender consisting of hydroquinone bis (2-hydroxyethyl) ether, and (c) a polyol component comprising a spiroglycol-initiated polycaprolactone polyol. In this embodiment, the polyol component may also comprise a polysiloxane polyol. In another embodiment, the thermoplastic polyurethane composition comprises the reaction product of (a) a polyisocyanate, (b) a chain extender comprising hydroquinone bis (2-hydroxyethyl) ether, and (c) a polyol component consisting of a spiroglycol-initiated polycaprolactone polyol. In another embodiment, the thermoplastic polyurethane composition comprises the reaction product of (a) a polyisocyanate, (b) a chain extender consisting of hydroquinone bis (2-hydroxyethyl) ether, and (c) a polyol component consisting of a spiroglycol-initiated polycaprolactone polyol.

Polyisocyanate

The TPU compositions described herein are made using a polyisocyanate, which may be selected from one or more polyisocyanates or diisocyanates. Examples of useful polyisocyanates include aromatic diisocyanates such as 4,4'-methylenebis(phenyl isocyanate) (MDI), m-xylene diisocyanate (XDI), phenylene-1,4-diisocyanate, naphthalene-1,5-diisocyanate, 3,3'-dimethyl-4,4'-biphenylene diisocyanate (TODI), 1,5-naphthalene diisocyanate (NDI), and toluene diisocyanate (TDI); as well as aliphatic diisocyanates such as hexamethylene diisocyanate (HDI), 1,4-bis(isocyanatomethyl)cyclohexane (H6XDI), isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), and dicyclohexylmethane-4,4'-diisocyanate (H12MDI). Mixtures of two or more polyisocyanates may be used. In some embodiments, the polyisocyanate comprises or consists of MDI. In some embodiments, the polyisocyanate comprises or consists of HDI.

Chain Extender

The TPU compositions described also include a chain extender. Often chain extenders used to make thermoplastic polyurethanes include relatively small polyhydroxy compounds, for example lower aliphatic or short chain glycols having from 2 to 20, or 2 to 12, or 2 to 10 carbon atoms, such as ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy)phenyl]propane (HEPP), hexamethylenediol, heptanediol, nonanediol, dodecanediol, 3-methyl-1,5-pentanediol, ethylenediamine, butanediamine, hexamethylenediamine, and hydroxyethyl resorcinol (HER), and the like, as well as mixtures thereof. It has been discovered that the use of hydroquinone bis (2-hydroxyethyl) ether, also known as hydroquinone bis(2-hydroxyethyl) ether (HQEE), in combination with the polycaprolactone polyol described herein provide an unexpectedly lower compression set % than other similar thermoplastic polyurethane materials. In some embodiments of the invention, the chain extender component comprises hydroquinone bis (2-hydroxyethyl) ether. In other embodiments, the chain extender component consists of hydroquinone bis (2-hydroxyethyl) ether and is free of all other glycol chain extenders.

Polyol Component

Thermoplastic polyurethane compositions of the present invention are made using a polyol component which comprises a spiroglycol-initiated polycaprolactone polyol. The spiroglycol-initiated polycaprolactone polyol comprises the reaction product of a caprolactone monomer with a alkylene substituted saturated spirocyclic-diol, an alkylene substituted saturated spirocyclic-diamine, or a combination thereof.

The spiroglycol-initiated polycaprolactone polyols useful in the present invention are made from caprolactone monomers such as ε-caprolactone or 2-oxepanone and a bifunctional initiator comprising an alkylene substituted saturated spirocyclic-diol, an alkylene substituted saturated spirocyclic-diamine, or a combination thereof, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

In one embodiment, the alkylene substituted spirocyclic compound comprises an alkylene substituted saturated spirocyclic-diol, an alkylene substituted saturated spirocyclic-diamine, or a combination thereof and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. In one embodiment, the alkylene substituted spirocyclic compound is a spiroheterocycle containing 2 heteroatoms in each ring, and the heteroatoms are oxygen, nitrogen, sulfur or phosphorous. In one embodiment, the alkylene substituted spirocyclic compound is a spiroheterocycle containing 2 heteroatoms in each ring and the heteroatoms are oxygen or nitrogen. In one embodiment, the alkylene substituted spirocyclic compound is a spiroheterocycle containing 2 heteroatoms in each ring and the heteroatoms are oxygen.

In one embodiment, the alkylene substituted spirocyclic compound has a structural formula:

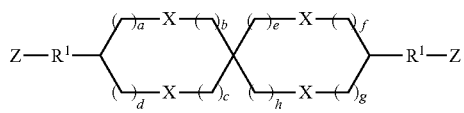

wherein each X is independently selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3. In one embodiment, a is equal to g, b is equal to h, c is equal to e and d is equal to f. In one embodiment, all X are identical. In one embodiment, all X are identically selected from 0 or $NR^2$, wherein $R^2$ represents a hydrogen atom or an alkyl group containing from 1 to about 6 carbon atoms, a is equal to g, b is equal to h, c is equal to e and d is equal to f. In one embodiment, the spirocyclic-dialkylene compound contains two 6-membered ring, X is independently selected from O or $NR^2$, wherein $R^2$ represents a hydrogen atom or an alkyl group containing from 1 to about 6 carbon atoms, $R^1$ is an alkylene containing from 1 to 4 carbon atoms, Z is —OH or $NH_2$, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0. In one embodiment, the spirocyclic-dialkylene compound contains two 6-membered ring, X is identically selected from O or $NR^2$, wherein $R^2$ represents a hydrogen atom or an alkyl group containing from 1 to about 6 carbon atoms, $R^1$ is an alkylene containing from 1 to 4 carbon atoms, Z is —OH or $NH_2$, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0. In one embodiment, the spirocyclic-dialkylene compound contains two 6-membered ring, X is O, $R^1$ is 1,1-dimethylethyl, Z is —OH, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0.

In one embodiment, the alkylene substituted spirocyclic compound has a structural formula:

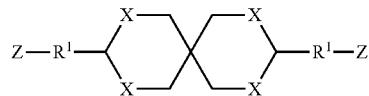

wherein each X is independently selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms. In one embodiment, X is identically selected from O, $CHR^2$, $NR^2$, S, $PR^2$, wherein each $R^2$ represents a hydrogen atom or an alkyl group containing from 1 to about 6 carbon atoms. In one embodiment, X is O, $R^1$ is 1,1-dimethylethyl, and Z is —OH.

The thermoplastic polyurethane compositions of the present invention may further comprise a polysiloxane polyol. Suitable polysiloxane polyols include a-w-hydroxyl or amine or carboxylic acid or thiol or epoxy terminated polysiloxanes. Examples include poly(dimethylsiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

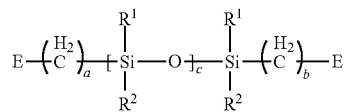

in which: each R1 and R2 are independently a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR^3$. In the hydroxyl-containing polysiloxanes, at least one of the E groups is OH. In some embodiments, both $R^1$ and $R^2$ are methyl groups.

Suitable examples include α,ω-hydroxypropyl terminated poly(dimethysiloxane) and α,ω-amino propyl terminated poly(dimethylsiloxane), both of which are commercially available materials. Further examples include copolymers of the poly(dimethylsiloxane) materials with a poly(alkylene oxide). In one embodiment, the polysiloxane comprises or consists of dihydroxypolydimethyl siloxane.

The polyol component may comprise a mixture of the spiroglycol-initiated polycaprolactone polyol and the polysiloxane polyol. In one embodiment, the polyol component consists of a mixture of the spiroglycol-initiated polycaprolactone polyol and the polysiloxane polyol.

In some embodiments, the polyol component may include other known polyols such as polyester polyols, polyether polyols, or polycarbonate polyols. However, in some embodiments, the polyol component is free of other polyester polyols, polyether polyols, or polycarbonate polyols.

The polyisocyanate component and the chain extender component of the present make up the "hard segment" of the thermoplastic polyurethane. In some embodiments of the present invention, the thermoplastic polyurethane compositions have a hard segment content of 20 wt % to 50 wt %, for example, 20 wt % to 45 wt %, or even further 25 wt % to 40 wt %, or even further, 25 wt % to 38 wt % based on the total weight of all reactants.

To make the thermoplastic polyurethane composition of the present invention, the three reactants (the spiroglycol-initiated polycaprolactone polyol, the polyisocyanate, and the benezene glycol chain extender) may be reacted together. Any known processes to react the three reactants may be used to make the thermoplastic polyurethane of the present invention. In one embodiment, the process is a so-called "one-shot" process where all three reactants are added to an extruder reactor and reacted. The equivalent weight amount of the diisocyanate to the total equivalent weight amount of the hydroxyl containing components, that is, the polyol intermediate and the chain extender glycol, can be from about 0.95 to about 1.10, or from about 0.96 to about 1.02, and even from about 0.97 to about 1.05.

The TPU can also be prepared utilizing a pre-polymer process. In the pre-polymer route, the polyol intermediates are reacted with generally an equivalent excess of one or more diisocyanates to form a pre-polymer solution having free or unreacted diisocyanate therein. Subsequently, a chain extender, as noted above, is added in an equivalent amount generally equal to the isocyanate end groups as well as to any free or unreacted diisocyanate compounds. The overall equivalent ratio of the total diisocyanate to the total equivalent of the polyol intermediate and the chain extender is thus from about 0.95 to about 1.10, or from about 0.96 to about 1.02 and even from about 0.97 to about 1.05. Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, including extruders equipped with barrier screws having a length to diameter ratio of at least 20 and in some embodiments at least 25.

The described process for preparing the TPU of the invention includes both the "pre-polymer" process and the "one shot" process, in either a batch or continuous manner. That is, in some embodiments the TPU may be made by reacting the components together in a "one shot" polymerization process wherein all of the components, including reactants are added together simultaneously or substantially simultaneously to a heated extruder and reacted to form the TPU. While in other embodiments the TPU may be made by first reacting the polyisocyanate component with some portion of the polyol component forming a pre-polymer, and then completing the reaction by reacting the pre-polymer with the remaining reactants, resulting in the TPU.

The invention therefore also comprises a method of making a thermoplastic polyurethane comprising reacting (a) a polyisocyanate, (b) a chain extender component comprising or consisting of hydroquinone bis (2-hydroxyethyl) ether, and (c) a polyol component comprising a spiroglycol-initiatd polycaprolactone polyol which is the reaction product of a caprolactone monomer with an alkylene substituted spirocyclic compound, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. The invention therefore also comprises a method of making a thermoplastic polyurethane comprising reacting (a) a polyisocyanate, (b) a chain extender component comprising or consisting of hydroquinone bis (2-hydroxyethyl) ether, and (c) a polyol component comprising a polysiloxane polyol and a spiroglycol-initiatd polycaprolactone polyol which is the reaction product of a caprolactone monomer with an alkylene substituted spirocyclic compound, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

After exiting the extruder, the composition is normally pelletized and stored in moisture proof packaging and is ultimately sold in pellet form. It being understood that the composition would not always need to be pelletized, but rather could be extruded directly from the reaction extruder through a die into a final product profile.

Optionally, it may be desirable to utilize catalysts such as stannous and other metal carboxylates as well as tertiary amines. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethyl cyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like, phenyl mercuric propionate, lead octoate, iron acetylacetonate, magnesium acetylacetonate, or bismuth compounds such as bismuth octoate, bismuth laurate, and the like.

Various types of optional components can be present during the polymerization reaction, and/or incorporated into the thermoplastic polyurethane composition described herein. These include, but are not limited to, antioxidants, biocides, compatibilizers, electro-dissipative antistatic additives, fillers/reinforcing agents, flame and fire retardants, fungicides, impact modifiers, pigments, colorants, plasticizer, polymers, rheology modifiers, slip additives, and UV stabilizers. All of the additives described above may be used in an effective amount customary for these substances. These additional additives can be incorporated into the components of, or into the reaction mixture for, the preparation of the thermoplastic polyurethane composition, or after making the thermoplastic polyurethane composition. In another process, all the materials can be mixed with the thermoplastic polyurethane composition and then melted or they can be incorporated directly into the melt of the thermoplastic polyurethane composition.

The thermoplastic polyurethane compositions of the invention and any blends thereof may be formed into monolayer or multilayer films. These films may be formed by any of the conventional techniques known in the art including extrusion, co-extrusion, extrusion coating, lamination, blowing and casting or any combination thereof.

The thermoplastic polyurethane compositions of the invention or any blends thereof may also be used to prepare molded products using any molding process now known in the art or hereafter developed. Molding processes include but are not limited to, cast molding, cold forming matched-die molding, compression molding, foam molding, injection molding, gas-assisted injection molding, profile co-extrusion, profile extrusion, rotational molding, sheet extrusion, slush molding, spray techniques, thermoforming, transfer molding, vacuum forming, wet lay-up or contact molding, blow molding, extrusion blow molding, injection blow molding, and injection stretch blow molding or combinations thereof.

The thermoplastic polyurethane composition of the present invention may also be used to make an article by extrusion. That is the invention provides for an article which is made by forcing molten TPU through a die to form a shape with a fixed cross-section.

The invention also comprises a method of reducing the compression set of a thermoplastic polyurethane or an article comprising preparing a thermoplastic polyurethane composition comprising (a) a polyisocyanate, (b) a chain extender component comprising hydroquinone bis (2-hydroxyethyl) ether, and (c) a polyol component, comprising a spiroglycol-initiated polycaprolactone polyol which is the reaction product of a caprolactone monomer with an alkylene substituted spirocyclic compound, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. The polyol component may further comprise a polysiloxane polyol. In another embodiment, the invention comprises a method of reducing the compression set of a thermoplastic polyurethane or an article comprising preparing a thermoplastic polyurethane composition comprising (a) a polyisocyanate, (b) a chain extender component consisting of hydroquinone bis (2-hydroxyethyl) ether, and (c) a polyol component comprising a spirglycol-initiated polycaprolactone polyol which is the reaction product of a caprolactone monomer with an alkylene substituted spirocyclic compound, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. In this embodiment, the polyol component may further comprise a polysiloxane polyol. In still another embodiment, the invention comprises a method of reducing the compression set of a thermoplastic polyurethane or an article comprising preparing a thermoplastic polyurethane composition comprising (a) a polyisocyanate, (b) a chain extender component comprising of hydroquinone bis (2-hydroxyethyl) ether, and (c) a polyol component, consisting of a spiroglycol-initiated polycaprolactone polyol which is the reaction product of a caprolactone monomer with an alkylene substituted spirocyclic compound, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

The invention is further illustrated by the Examples below. In the Examples, SPG-PCL refers to a spiroglycol-initiated polyester polyol formed from the ring opening polymerization of epsilon caprolactone monomer and spiroglycol, having the formula:

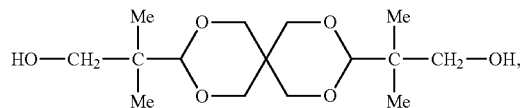

BDO-PCL refers to a polycaproplactone formed from the ring opening polymerization of epsilon caprolactone and butanediol, PDMS refers to dihydroxy polydimethyl siloxane, HQEE refers to a hydroquinone bis (2-hydroxyethyl) ether chain extender, BDO refers to 1,4-butanediol chain extender, MDI refers to 4,4'-methylenebis(phenyl isocyanate), HDI refers to hexamethylene diisocyanate, and H6XDI refers to 1,4-bis(isocyanatomethyl)cyclohexane (H6XDI).

A series of comparative thermoplastic polyurethane compositions were formed by reacting the components noted in Table 1.

TABLE 1

|  | A | B | C | D | E |
|---|---|---|---|---|---|
| Polyester type | SPG-PCL | SPG-PCL | BDO-PCL | BDO-PCL | BDO-PCL |
| Polyester MW[1] | 3000 | 3000 | 2000 | 2000 | 2000 |
| Polysiloxane polyol | PDMS | PDMS | PDMS | PDMS | PDMS |
| Chain Extender | BDO | HDO | HQEE | BDO | HQEE |
| Diisocyanate | MDI | MDI | MDI | MDI | H6XDI |
| Hard Segment wt % | 39 | 39 | 38 | 52 | 39 |
| Catalyst[2] (ppm) | 25 | 25 | 25 | 100 | 100 |

[1]Theoretical
[2]Bismuth Neodecanoate

A series of inventive thermoplastic polyurethane compositions were formed by reacting the components noted in Table 2.

TABLE 2

|  | 1 | 2 | 3 | 4 | 5 | 6 |
|---|---|---|---|---|---|---|
| Polyester type | SPG-PCL | SPG-PCL | SPG-PCL | SPG-PCL | SPG-PCL | SPG-PCL |
| Polyester MW | 3000 | 3000 | 3000 | 2000 | 3000 | 3000 |
| Polysiloxane Polyol | PDMS | PDMS |  | PDMS | PDMS | PDMS |
| Chain Extender | HQEE | HQEE | HQEE | HQEE | HQEE | HQEE |

TABLE 2-continued

| | 1 | 2 | 3 | 4 | 5 | 6 |
|---|---|---|---|---|---|---|
| Diisocyanate | MDI | HDI | MDI | MDI | MDI | H6XDI |
| Hard Segment wt % | 39 | 39 | 39 | 39 | 31 | 39 |
| Catalyst (ppm) | 25 | 100 | 25 | 25 | 25 | 100 |

The exemplary compositions made above were evaluated for compression set % according to ASTM D395. The results are set forth in Table 3.

TABLE 3

| Compression Set at | A | B | C | D | E | 1 | 2 | 3 | 4 | 5 | 6 |
|---|---|---|---|---|---|---|---|---|---|---|---|
| %100° C. for 70 hours | 62 | 53 | 39 | 48 | 56 | 37 | 35 | 36 | 36 | 38 | 36 |
| %125° C. for 22 hours | 88 | 63 | 52 | 65 | 80 | 35 | 33 | 34 | 35 | 37 | 46 |

The inventive examples consistently unexpectedly lower compression set than comparable formulations.

All molecular weight values provided herein are weight average molecular weights unless otherwise noted. All molecular weight values have been determined by hydroxyl number according to ASTM D4274-99 unless otherwise noted.

As used herein, the transitional term "comprising", which is synonymous with "including", "containing", or "characterized by", is inclusive or open-ended and does not exclude additional, un-recited elements or method steps. However, in each recitation of "comprising" herein, it is intended that the term also encompass, as alternative embodiments, the phrases "consisting essentially of" and "consisting of", where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A thermoplastic polyurethane composition comprising the reaction product of (a) a polyisocyanate, (b) a chain extender component comprising hydroquinone bis (2-hydroxyethyl) ether, and (c) a polyol component comprising a spirocyclic compound-initiated polycaprolactone polyol which is the reaction product of a caprolactone monomer with an alkylene substituted spirocyclic compound, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

2. The thermoplastic polyurethane composition of claim 1, wherein the alkylene substituted spirocyclic compound comprises an alkylene substituted saturated spirocyclic-diol.

3. The thermoplastic polyurethane composition of claim 1, wherein the alkylene substituted spirocyclic compound comprises an alkylene substituted saturated spirocyclic-diamine.

4. The thermoplastic polyurethane composition of claim 1, wherein the alkylene substituted spirocyclic compound is a spiroheterocycle containing 2 heteroatoms in each ring, where the heteroatoms are oxygen, nitrogen, sulfur or phosphorous.

5. The thermoplastic polyurethane composition of claim 1, wherein the structural formula of the alkylene substituted spirocyclic compound is:

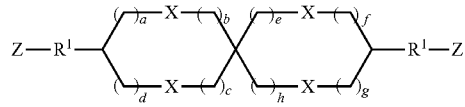

wherein each X is selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3.

6. The thermoplastic polyurethane composition of claim 5, wherein a is equal to g, b is equal to h, c is equal to e and d is equal to f.

7. The thermoplastic polyurethane composition of claim 5, wherein the alkylene substituted spirocyclic compound contains two 6-membered ring, X is O, $R^1$ is 1,1-dimethylethyl, Z is —OH, and where either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0.

8. The thermoplastic polyurethane composition of claim 1, wherein the structural formula of the alkylene substituted spirocyclic compound is:

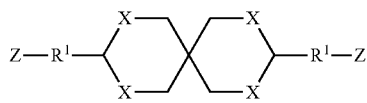

wherein each X is independently selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms.

9. The thermoplastic polyurethane composition of claim 8 wherein X is O, $R^1$ is 1,1-dimethylethyl, and Z is —OH.

10. The thermoplastic polyurethane composition of claim 1, wherein the alkylene substituted spirocyclic compound is

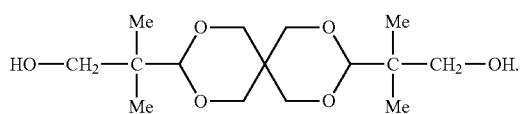 [SMILES: CC(C)(CO)C1OCC2(CO1)COC(C(C)(C)CO)OC2]

11. The thermoplastic polyurethane composition of claim 1, wherein the polyisocyanate is 4,4'-methylenebis(phenyl isocyanate).

12. The thermoplastic polyurethane composition of claim 1, wherein the polyisocyanate is hexamethylene diisocyanate.

13. The thermoplastic polyurethane composition of claim 1, wherein the polyol component further comprises a polysiloxane polyol.

14. The thermoplastic polyurethane composition of claim 13, wherein the polysiloxane comprises hydroxy functional polydimethyl siloxane.

15. The thermoplastic polyurethane composition of claim 13, wherein the polysiloxane comprises dihydroxypolydimethyl siloxane.

16. An article having reduced compression set, wherein the article comprises the thermoplastic polyurethane composition of claim 1.

17. The article of claim 16, wherein the thermoplastic polyurethane composition has a Shore A Hardness of 85A to 95A.

18. A method of reducing the compression set of a thermoplastic polyurethane comprising:
preparing a thermoplastic polyurethane composition comprising a) a polyisocyanate, (b) a chain extender component comprising hydroquinone bis (2-hydroxyethyl) ether, and (c) a polyol component, comprising a spirocyclic compound-initiated polycaprolactone polyol which is the reaction product of a caprolactone monomer with an alkylene substituted spirocyclic compound, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

19. The method of claim 18, wherein the polyol component further comprises a polysiloxane polyol.

20. The method of claim 19, wherein the polysiloxane comprises dihydroxypolydimethyl siloxane.

* * * * *